US010968368B2

(12) United States Patent
Dubey

(10) Patent No.: US 10,968,368 B2
(45) Date of Patent: Apr. 6, 2021

(54) TAMPER EVIDENT SECURITY LABELS

(71) Applicant: Avery Dennison Corporation, Glendale, CA (US)

(72) Inventor: Anil Kumar Dubey, Bengaluru (IN)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 16/454,407

(22) Filed: Jun. 27, 2019

(65) Prior Publication Data

US 2019/0389194 A1 Dec. 26, 2019

Related U.S. Application Data

(63) Continuation of application No. 14/496,748, filed on Sep. 25, 2014, now Pat. No. 10,377,117.

(Continued)

(51) Int. Cl.
*G09F 3/03* (2006.01)
*G09F 3/10* (2006.01)
(Continued)

(52) U.S. Cl.
CPC ............... *C09J 7/29* (2018.01); *B32B 5/022* (2013.01); *B32B 5/18* (2013.01); *B32B 5/24* (2013.01); *B32B 7/06* (2013.01); *B32B 7/12* (2013.01); *B32B 27/06* (2013.01); *B32B 27/32* (2013.01); *B32B 27/34* (2013.01); *B32B 27/36* (2013.01); *B32B 29/002* (2013.01); *B32B 37/12* (2013.01); *G09F 3/0292* (2013.01); *G09F 3/10* (2013.01); *B32B 2307/4026* (2013.01); *B32B 2307/54* (2013.01); *B32B 2307/582* (2013.01); *B32B 2307/748* (2013.01); *B32B 2519/00* (2013.01);
(Continued)

(58) Field of Classification Search
CPC .................................................. C09J 2203/338
See application file for complete search history.

(56) References Cited

U.S. PATENT DOCUMENTS 3,864,855 A 2/1975 Pekko et al.
3,925,584 A 12/1975 Suzuki et al.
(Continued)

FOREIGN PATENT DOCUMENTS

EP 1403190 7/2007
EP 2282303 2/2011
(Continued)

OTHER PUBLICATIONS

International Search Report and Written Opinion dated Jan. 8, 2015 issued in corresponding International Application No. PCT/US2014/057465 filed Sep. 25, 2014.

(Continued)

*Primary Examiner* — Ian A Rummel

(57) ABSTRACT

Labels and multilayer adhesive assemblies and laminates are described that contain one or more tamper indicating layers. After adhering to a surface of interest, upon attempted removal of the label from the surface or other manipulation of the label, the label separates along the tamper indicating layer. One or both exposed faces of the separated tamper indicating layer may include tamper indicating and or authenticity indicating provisions such as indicia to further provide evidence of attempted tampering.

24 Claims, 3 Drawing Sheets

Related U.S. Application Data

(60) Provisional application No. 61/882,412, filed on Sep. 25, 2013.

(51) Int. Cl.
| | | |
|---|---|---|
| *B32B 37/12* | (2006.01) | |
| *G09F 3/02* | (2006.01) | |
| *C09J 7/29* | (2018.01) | |
| *B32B 5/02* | (2006.01) | |
| *B32B 5/18* | (2006.01) | |
| *B32B 5/24* | (2006.01) | |
| *B32B 7/06* | (2019.01) | |
| *B32B 7/12* | (2006.01) | |
| *B32B 27/06* | (2006.01) | |
| *B32B 27/32* | (2006.01) | |
| *B32B 27/34* | (2006.01) | |
| *B32B 27/36* | (2006.01) | |
| *B32B 29/00* | (2006.01) | |
| *G09F 3/00* | (2006.01) | |

(52) U.S. Cl.
CPC . *C09J 2203/338* (2013.01); *G09F 2003/0257* (2013.01); *Y10T 156/10* (2015.01); *Y10T 428/24802* (2015.01); *Y10T 428/2848* (2015.01)

(56) References Cited

U.S. PATENT DOCUMENTS

| | | |
|---|---|---|
| 4,876,123 A | 10/1989 | Rivera et al. |
| 6,372,341 B1 | 4/2002 | Jung et al. |
| 6,977,111 B2 | 12/2005 | Yamaguchi et al. |
| 7,244,496 B2 | 7/2007 | Huffer |
| 8,158,230 B2 | 4/2012 | Culbertson et al. |
| 2003/0180530 A1 | 9/2003 | Otten et al. |
| 2005/0067497 A1* | 3/2005 | Jones ............... B42D 25/23 235/492 |
| 2012/0216951 A1 | 8/2012 | Kian et al. |
| 2013/0133532 A1 | 5/2013 | Kian et al. |
| 2013/0133824 A1 | 5/2013 | Klan et al. |

FOREIGN PATENT DOCUMENTS

| | | |
|---|---|---|
| WO | 96/02048 | 1/1996 |
| WO | 99/55791 | 11/1999 |

OTHER PUBLICATIONS

International Preliminary Report on Patentability dated Mar. 29, 2016 issued in corresponding International Application No. PCT/US2014/057465 filed Sep. 25, 2014.

\* cited by examiner

TAMPER EVIDENT SECURITY LABELS

CROSS-REFERENCE TO RELATED APPLICATION

The present application is a continuation of U.S. patent application Ser. No. 14/496,748 filed Sep. 25, 2014, which claims the benefit of U.S. Provisional Application No. 61/882,412 filed Sep. 25, 2013, both of which are incorporated by reference herein in their entireties.

FIELD

The present subject matter relates to labels and adhesive laminate assemblies that can be used on various containers and surfaces to indicate authenticity, previous openings, or attempted openings.

BACKGROUND

Currently, source authenticity labels and tamper indicating labels are in great demand due to extensive counterfeiting of products in the market. Many businesses are faced with this problem, and thus solutions are in great demand. Furthermore, tamper indicating labels are particularly important to indicate potential contamination of packaged food and medical products.

Product suppliers interested in using tamper indicating labels typically seek an economical solution which provides a physical or visual indication of tampering.

Hologram security labels are commonly used as a tamper indication or authenticating solution in the market. However, that technology has become common and highly duplicated and is losing its effectiveness in security and tamper evident applications.

To overcome these problems, void label technology was introduced as another tamper evident solution. However, void label technology requires a multiple step and relatively complex manufacturing process, which increases costs. Moreover, many labelling and packaging converters have replicated this technology such that void label technology is also losing its effectiveness as a security indicating solution.

Foamatic labels are another tamper indicating solution in which a film face is designed to be weak and split into multiple layers upon tampering. However, these labels have become readily available which has reduced their reliability as a security and tamper evident solution. Moreover, this technology is relatively costly which limits its use in emerging countries and low marginal profit products.

Accordingly, a need exists for a new label construction which provides evidence of tampering or attempted tampering, enhanced security features, high security reliability due to controlled availability, and low cost.

SUMMARY

The difficulties and drawbacks associated with previous authenticity and tamper indicating strategies are addressed in the present labels, multilayer laminates, and related methods.

In one aspect, the present subject matter provides an adhesive laminate configured to provide indication of tampering. The laminate comprises an outer layer defining an outer face, a first adhesive layer adjacent to the outer layer, a tamper indicating layer adjacent to the first adhesive layer, and a second adhesive layer adjacent to the tamper indicating layer. The first adhesive layer is disposed between the outer layer and the tamper indicating layer. And the tamper indicating layer is disposed between the first adhesive layer and the second adhesive layer. Upon adherence of the second adhesive layer to a surface of interest and subsequent manipulation of the laminate, the tamper indicating layer at least partially separates along a separation plane or separation interface within the tamper indicating layer to thereby provide indication of tampering.

In another aspect, the present subject matter provides an adhesive laminate comprising an outer layer defining an outer face. The outer layer includes a paper or polymeric material. The laminate also comprises a tamper indicating layer. The tamper indicating layer includes one or more interior weak materials. The laminate also comprises a pressure sensitive adhesive layer disposed immediately adjacent to the tamper indicating layer. The tamper indicating layer is disposed between the outer layer and the pressure sensitive adhesive layer. The laminate also comprises tamper indicating and or authenticity indicating provisions disposed within the tamper indicating layer. Upon adherence of the pressure sensitive adhesive layer to a surface of interest and subsequent manipulation of the laminate, the tamper indicating layer at least partially separates along a separation plane or separation interface within the tamper indicating layer and at least a portion of the tamper indicating and or authenticity indicating provisions disposed within the tamper indicating layer are exposed along the separation plane or separation interface to thereby provide indication of tampering and or authenticity.

In yet another aspect, the present subject matter provides a method of providing indication of tampering along a container region. The method comprises providing an adhesive laminate including (i) an outer layer, (ii) a first adhesive layer adjacent to the outer layer, (iii) a tamper indicating layer that includes one or more interior weak materials, and (iv) a second adhesive layer. The tamper indicating layer is disposed between the first and the second adhesive layers. The method also comprises adhering the second adhesive layer of the laminate to the container region of interest. Upon subsequent manipulation of the laminate, the tamper indicating layer at least partially separates along a separation plane or separation interface within the tamper indicating layer to thereby provide indication of tampering.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Generally, the present subject matter provides labels and/or adhesive laminate assemblies that comprise one or more tamper indicating layers. In certain versions, the tamper indicating layer(s) are referred to herein as interior weak or weakened material layers. Upon adhering the label or laminate to a surface of interest, and subsequent removal or attempted removal of at least a portion of the label from the surface to which the label is adhered, separation of the label occurs. The separation occurs within a tamper indicating layer of the label to thus provide evidence, and particularly visual evidence, that a previous manipulation or tampering occurred. In many embodiments of the present subject matter, the separation of label layers occurs exclusively within the tamper indicating layer.

The labels or adhesive laminates of the present subject matter generally comprise an outer layer, at least one tamper indicating layer, an adhesive layer or region disposed between the outer layer and the tamper indicating layer, and another adhesive layer or region disposed along the tamper indicating layer for adhesively contacting a surface of interest, such as a container or package face. In certain embodiments, the tamper indicating layer includes tamper indicating and or authenticity indicating provisions which are described in greater detail herein. In many embodiments, the labels or adhesive laminates also comprise a release liner or layer that covers the adhesive which adheres the label or laminate to a surface of interest. Prior to such adherence, the release liner is removed to thereby expose the adhesive. The labels or adhesive laminates may comprise one or more additional layers and/or components.

Figure 1:
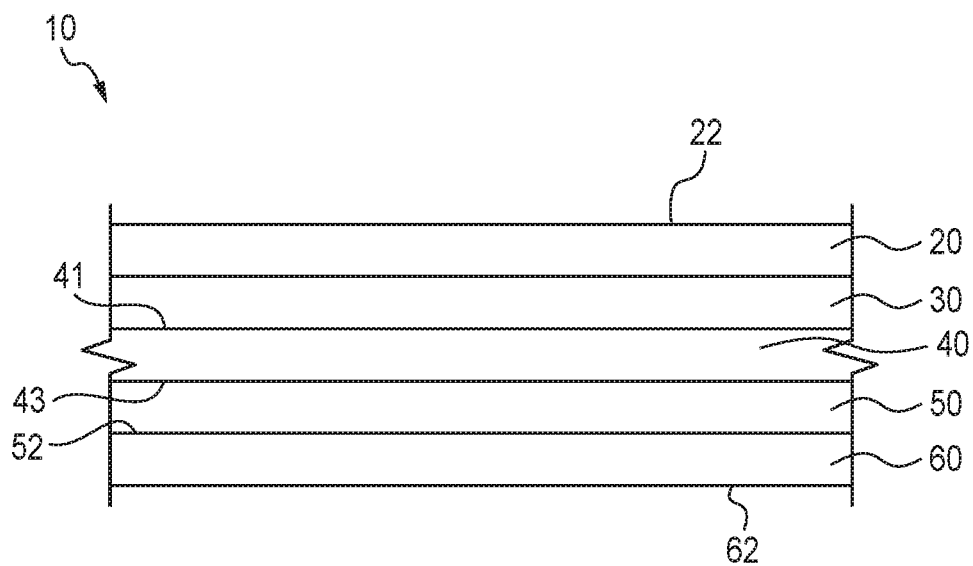
FIG. 1 is a schematic cross sectional view of an embodiment of a security laminate in accordance with the present subject matter.

FIG. 1 illustrates a security laminate or label 10 in accordance with the present subject matter. The laminate 10 comprises an outer layer 20 defining an outermost face 22, a first layer of adhesive 30 adjacent to the outer layer 20, a tamper indicating layer 40, and another layer of adhesive 50 adjacent to the tamper indicating layer 40. The tamper indicating layer is disposed between the adhesive layers 30 and 50. In certain embodiments, the adhesive layer 30 is immediately adjacent to and contacts a face 41 of the tamper indicating layer 40. And, in certain embodiments, the adhesive layer 50 is immediately adjacent to and contacts a face 43 of the tamper indicating layer 40. The security laminate 10 may optionally comprise a release liner 60 extending along and protectively covering an otherwise exposed face 52 of the adhesive layer 50. As will be appreciated, the release liner 60 can be a siliconized release layer. The underside or outer face of the release liner 60 is shown in FIG. 1 as face 62.

Figure 2:
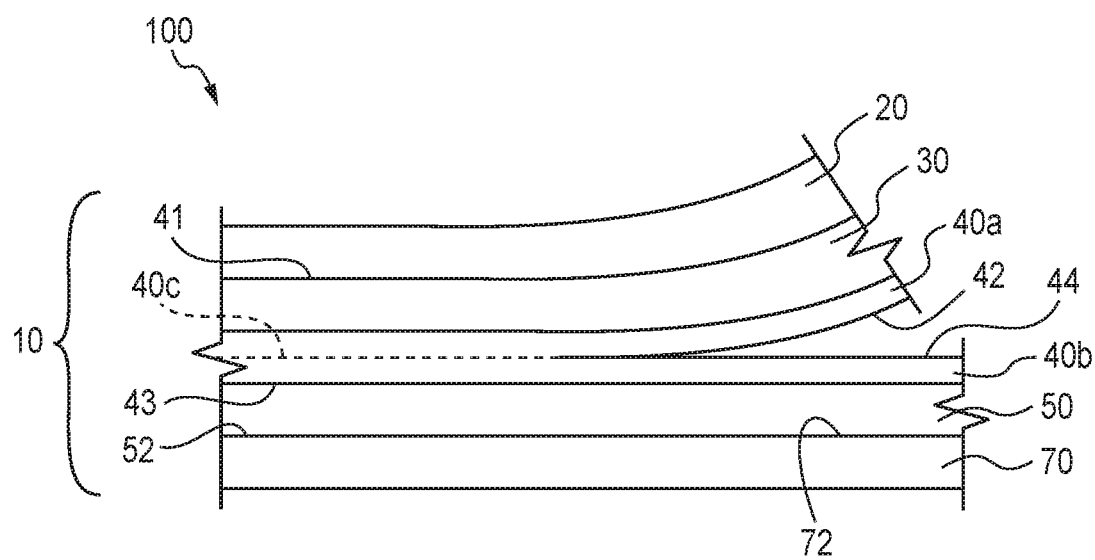
FIG. 2 is another schematic cross sectional view illustrating partial separation of the security laminate depicted in FIG. 1 after adhesive application to a substrate.

FIG. 2 illustrates a system 100 of the laminate 10 depicted in FIG. 1 after contact and adherence to a surface or substrate of interest 70. As will be appreciated, the laminate 10 is adhered to an outer surface 72 of the substrate 70 by removal of the release liner 60 to thereby expose an adhesive face 52. Once exposed, the adhesive face 52 is contacted with and adhered to the outer surface 72. The present subject matter also includes labels and adhesive laminates which are free of a release layer or liner, and hence are referred to as "linerless." The exposed linerless adhesive face can be selectively activated by known methods if necessary prior to contact and application to a surface of interest. Descriptions of linerless technology and activation strategies are described in US 2013/0133824; US 2013/0133532; and US 2012/0216951 for example.

FIG. 2 also illustrates partial separation of a portion of the laminate 10 containing the outer layer 20 and the adhesive layer 30, from a portion of the laminate containing the second adhesive layer 50. As shown in FIG. 2, separation of the laminate 10 occurs within the tamper indicating layer 40. Thus, after separation, a first portion of the layer 40, i.e., first portion 40a, is retained with the laminate portion including the outer layer 20 and the adhesive layer 30, and a second portion of the layer 40, i.e., second portion 40b, is retained with the laminate portion including the adhesive layer 50. Separation between layer portions 40a and 40b occurs along a separation plane, boundary, or interface 40c. The separation plane, boundary, and/or interface is described in greater detail herein.

In certain embodiments, the labels and laminates of the present subject matter generally separate or split along a midsection or midplane extending within the tamper indicating layer. However, the present subject matter includes the use of tamper indicating layers which separate or split along one or more predefined regions or planes within the tamper indicating layer. The predefined region or plane may extend entirely or partially along the midsection or midplane of the tamper indicating layer. Alternatively, the predefined region or plane may extend along a separation plane, boundary, or interface that is distinct and separate from a midsection or midplane of the tamper indicating layer. It is also contemplated that such predefined regions or planes could be in the form of structurally or chemically weakened regions extending in a tamper indicating layer such that upon separation of the layer, separation occurs along a desired separation interface. However, for many embodiments of the present subject matter, the tamper indicating layer(s) do not include, i.e., are free of, predefined separation regions or planes.

Specifically, upon adhering the label or laminate to a surface or substrate of interest and subsequent manipulation of the label or laminate, the tamper indicating layer at least partially separates along a plane or pseudo-plane of separation within the tamper indicating layer to thereby provide indication of tampering. As previously noted, in many embodiments of the present subject matter, the plane of separation within the tamper indicating layer is not predefined. The term "manipulation" as used herein refers to application of force to the label in an attempt to either remove or partially remove the adhered label from its underlying surface, or physical displacement of one surface region from another region of the underlying surface, such as typically associated with opening a container lid or aperture under the label. Generally, the labels and laminates of the present subject matter are constructed such that upon separation or partial separation of the tamper indicating layer, the outer layer remains adhered to at least a portion of the tamper indicating layer. Furthermore, in many embodiments of the present subject matter, the adhesive layers along one or both faces of the tamper indicating layer are continuous and are not pattern coated. Although the present subject matter includes patterned deposition or application of adhesive to form the adhesive layers, continuous and uniform layers typically lead to lower cost and reduced manufacturing complexity of the labels and laminates.

In addition to, or instead of, providing indicating of tampering or manipulation of a container or label, the present subject matter labels and/or adhesive laminate assemblies can also provide indication of authenticity. Evidence of authenticity is important in many retail segments to counter counterfeiting attempts. A label or laminate assembly in accordance with the present subject matter can include one or more authenticity indicating provisions. Such label is affixed to an article or container from a manufacturer or supplier of authentic articles. At a later time, the label may be at least partially separated to reveal the authenticity indicating provisions. Details and representative examples of such provisions are described in greater detail herein.

Figure 3:
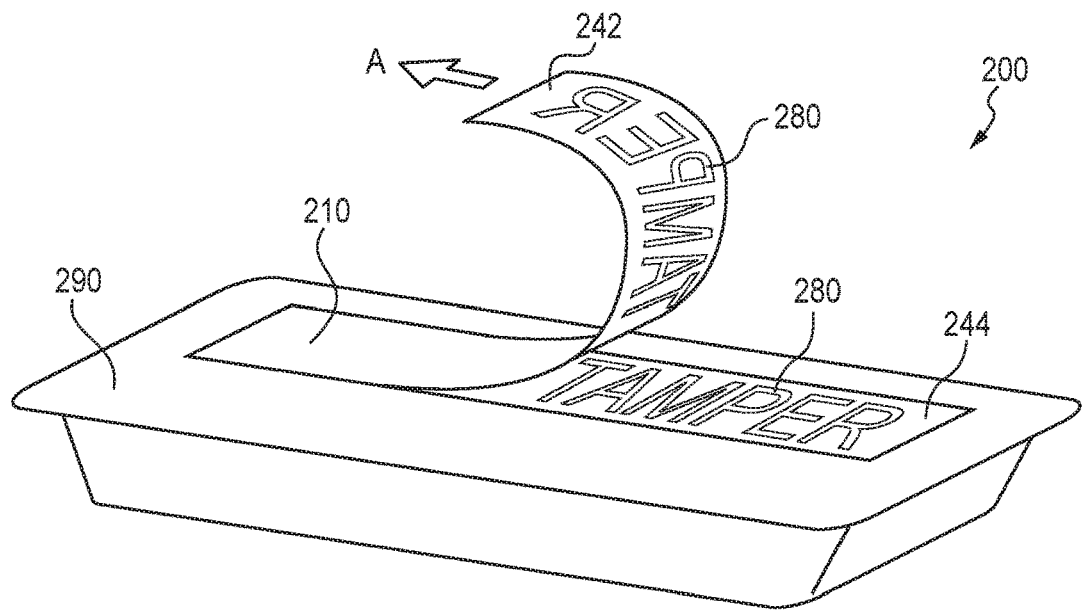
FIG. 3 is a perspective view illustrating partial separation of another embodiment of a security laminate after attachment to a container, illustrating tamper indicating indicia.

FIG. 3 illustrates a labeled system 200 comprising a container or package 290 having a security laminate 210 in accordance with the present subject matter adhered to a face of the container. The laminate 210 is incorporated or otherwise adhered to the container 290 such that upon opening the container face and displacing an end portion of the laminate 210 in the direction of arrow A for example, a tamper indicating layer within the laminate is separated into a first portion thereby revealing a first face 242 and a second portion revealing a second face 244. In certain embodiments, the laminate is adhered to a region of a container that includes a container aperture component or portion thereof. Examples of container aperture components include lids, spouts, caps, covers, doors, panels, tops, and nearly any component that is used to cover or enclose an opening or aperture in the container. Upon application of a label or laminate to at least a portion of a container and a portion of a container aperture component; opening, attempted opening, or other displacement of the container aperture component relative to the container will typically result in at least partial separation of the label or laminate within the tamper indicating layer. This is an example of label manipulation. FIG. 3 also illustrates another aspect of the present subject matter in which tamper indicating provisions 280 are included within a tamper indicating layer such as layer 40 of the embodiment depicted in FIGS. 1 and 2.

The tamper indicating provisions such as provisions 280 for example, can be located at any region(s) within the tamper indicating layer. The tamper indicating provisions can be in the form of a single region or a plurality of regions of materials or components within a tamper indicating layer. The tamper indicating provisions can be in the form of inks, dyes, pigments, colorants, or other visually perceivable materials that upon separation of a tamper indicating layer, are exposed to indicate, and typically visually indicate, that at least partial separation of the tamper indicating layer has occurred.

Figure 4:
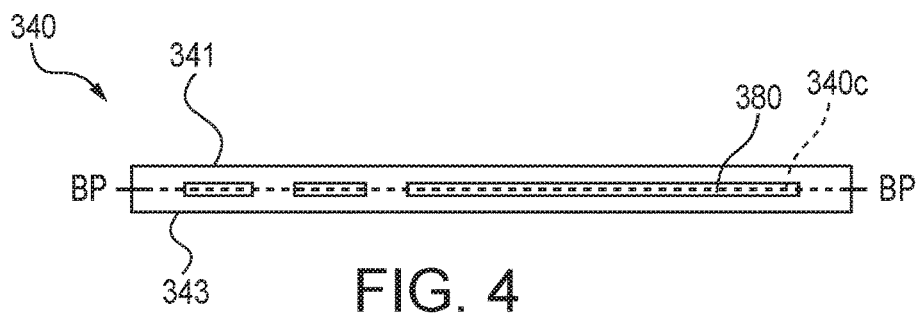
FIG. 4 is a schematic cross sectional view of an embodiment of a tamper indicating layer in accordance with the present subject matter.

In certain embodiments, the tamper indicating provisions are located along a plane that generally bisects the tamper indicating layer. This configuration is shown in FIG. 4. FIG. 4 is a schematic cross sectional view of a tamper indicating layer 340 including one or more tamper indicating provisions 380 within the interior of the layer 340. The tamper indicating provisions 380 extend along a separation plane 340c that also extends along a plane bisecting the layer 340, shown in FIG. 4 as plane BP. The layer 340 defines a first face 341 and a second oppositely directed face 343. Thus, when separating the layer 340 into two portions along the separation plane 340c, each portion will include a portion of the tamper indicating provisions 380.

Figure 5:
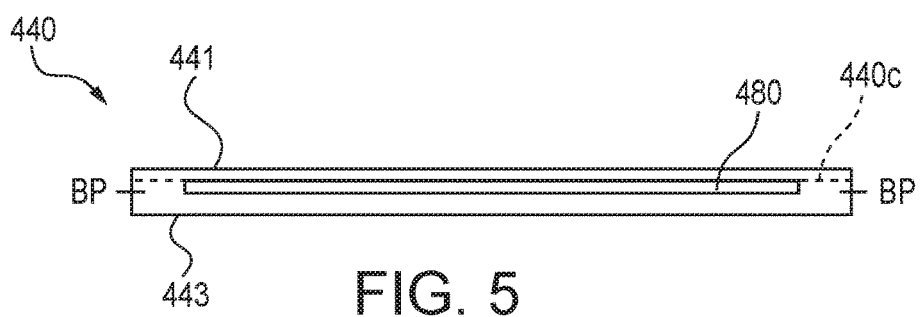
FIG. 5 is a schematic cross sectional view of another embodiment of a tamper indicating layer in accordance with the present subject matter.

In certain embodiments, the tamper indicating provisions are located in only one of the portions of the tamper indicating layer after separation. For example, in FIG. 5, a tamper indicating layer 440 is shown having a tamper indicating provision 480 disposed closer to a first face 441 of the layer 440 than a second face 443 of the layer 440. FIG. 5 also depicts the layer 440 as having a separation plane 440c located closer to the face 441 than the face 443. Thus, in this particular embodiment, the separation plane 440c is located between the first face 441 and a bisecting plane BP. FIG. 5 also depicts an orientation of the tamper indicating provisions 480 located along the plane of separation 440c but between that plane and the second face 443. Thus, upon separation of the layer 440 along the plane of separation 440c, the provisions 480 will be retained with and exposed along a lower portion of the layer 440.

Figure 6:
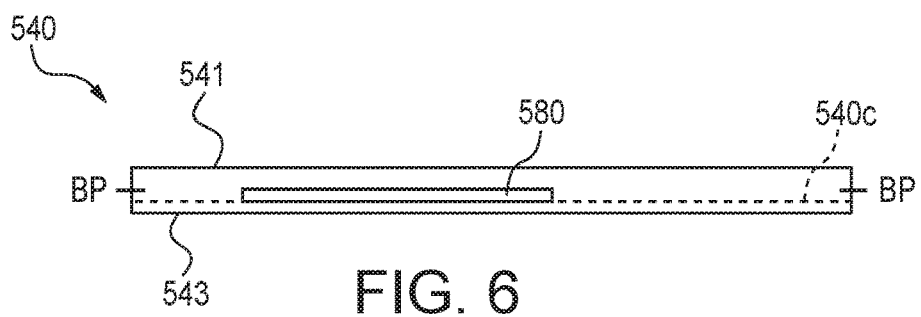
FIG. 6 is a schematic cross sectional view of another embodiment of a tamper indicating layer in accordance with the present subject matter.

FIG. 6 illustrates another tamper indicating layer 540 having a tamper indicating provision 580 disposed closer to a second face 543 of the layer 540 than a first face 541. FIG. 6 also depicts the layer 540 as having a separation plane 540c located closer to the face 543 than the face 541. Thus, in this embodiment, the plane of separation 540c is located between the second face 543 and a bisecting plane BP. FIG. 5 also depicts an orientation of the tamper indicating provisions 580 located along the plane of separation 540c but between that plane and the first face 541. Thus, upon separation of the layer 540 along the plane of separation 540c, the provisions 580 will be retained with and exposed along an upper portion of the layer 540.

Figure 7:
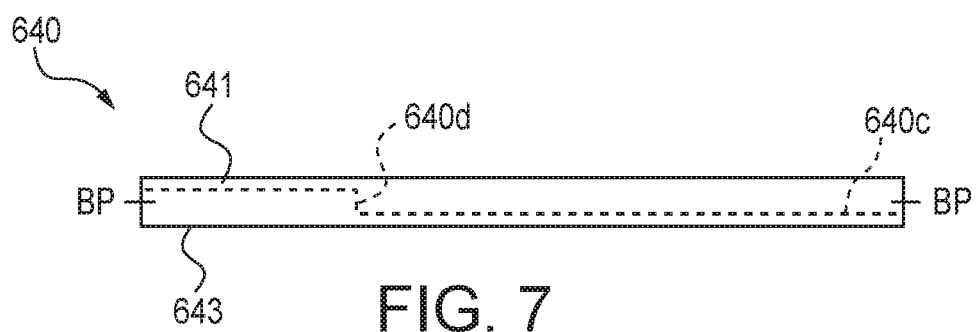
FIG. 7 is a schematic cross sectional view of another embodiment of a tamper indicating layer in accordance with the present subject matter.

FIG. 7 illustrates another tamper indicating layer 640 having an irregular or nonplanar separation interface 640c. The tamper indicating layer 640 defines oppositely directed faces 641 and 643. Specifically, the separation interface 640 includes one or more regions such as region 640d that crosses a bisecting plane BP associated with the layer 640. In particular versions, the crossing region 640d extends transversely to the bisecting plane BP.

Figure 8:
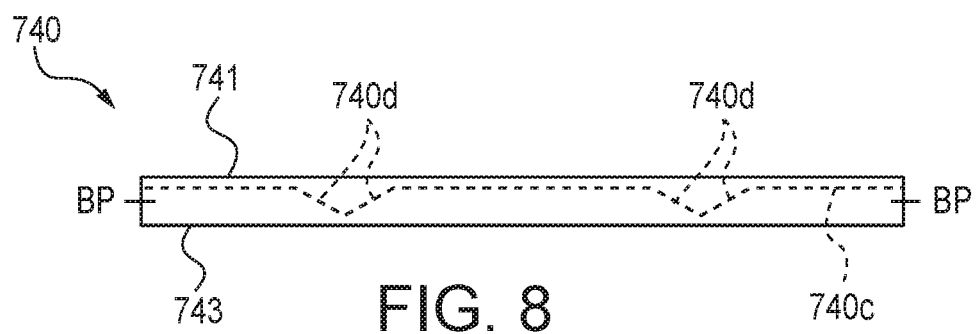
FIG. 8 is a schematic cross sectional view of another embodiment of a tamper indicating layer in accordance with the present subject matter.

FIG. 8 illustrates yet another tamper indicating layer 740 having an irregular and nonplanar separation interface 740c. The tamper indicating layer 740 defines oppositely directed faces 741 and 743. The separation interface includes one or more regions such as regions 740d that cross the bisecting plane BP and particularly cross the plane at an acute angle.

Another feature associated with many embodiments of the present subject matter labels and laminates, is that after subsequent separation or partial separation of the tamper indicating layer, the two separated portions of the tamper indicating layer cannot be easily re-attached to one another. Thus, the present subject matter labels and laminates provide a permanent indication of tampering and/or label manipulation.

In certain embodiments, the labels and laminates of the present subject matter are free of cuts, scores, weakened regions or lines, perforations, or pre-stressed areas. The absence of such features reduces cost and manufacturing complexity of the present subject matter labels and laminates. As previously described, upon container opening or other label manipulation, the label separates along a separation plane or interface that extends within the tamper indicating layer. Separation of the label in such manner is a result of the use of material(s) having particular characteristics in each of the layers of the label. These aspects of the present subject matter are as follows.

The outer layer of the labels and adhesive laminates of the present subject matter can be formed from a wide array of materials and combinations of materials. Typically, the outer layer includes one or more paper materials and/or polymeric film materials. For example, the outer layer may be comprised of such materials as paper (e.g., kraft, bond, offset, litho and sulfite paper) with or without sizing, or polymeric materials suitable for outer layer use such as polyolefins, polyesters, polyamides, etc. The surfaces of the outer layer material can be surface treated, to include for example corona treated or flame treated or top coat treated, to improve performance in various areas such as printability and/or adhesion to the adhesive layer in contact therewith. In certain embodiments, the polymer film material is chosen to provide the label construction with one or more of the desired properties such as printability, die-cuttability, matrix-strippability, dispensability, etc. In many embodiments, the outer layer is opaque so that if tamper indicating provisions are incorporated in the tamper indicating layer, such provisions will not be visible along the outer layer.

The outer layer may be a monolayer polymeric film facestock or the outer layer may comprise more than one polymer film layer, some of which may be separated by an internal adhesive layer. The thicknesses of each of the layers may be varied. Multilayer film facestocks may be prepared by techniques well known to those skilled in the art such as by laminating two or more preformed polymeric films (and, optionally an adhesive layer) together, or by the coextrusion of several polymeric films and, optionally, an adhesive layer. The multilayer facestocks may be prepared also by sequential coating and formation of individual layers, triple die coating, extrusion coating of multiple layers onto an adhesive layer, etc.

The adhesive layer disposed between the outer layer and the tamper indicating layer can be nearly any type of adhesive such as a hot melt adhesive, an emulsion adhesive, a solvent based adhesive, a UV curable adhesive, and the like. In certain applications, this layer of adhesive can be a pressure sensitive adhesive.

A description of useful pressure sensitive adhesives may be found in Encyclopedia of Polymer Science and Engineering, Vol. 13. Wiley-Interscience Publishers (New York, 1988). Additional description of useful pressure sensitive adhesives may be found in Encyclopedia of Polymer Science and Technology, Vol. 1, Interscience Publishers (New York, 1964).

The adhesives may generally be classified into the following categories: random copolymer adhesives such as those based upon acrylate and/or methacrylate copolymers, a-olefin copolymers, silicone copolymers, chloroprene/acrylonitrile copolymers, and the like; and block copolymer adhesives including those based upon linear block copolymers (i.e., A-B and A-B-A type), branched block copolymers, star block copolymers, grafted or radial block copolymers, and the like, and natural and synthetic rubber adhesives. In one embodiment, the adhesive of the adhesive layer is an emulsion acrylic-based pressure sensitive adhesive.

The adhesive layer disposed along on opposite face of the tamper indicating layer relative to the previously noted adhesive layer and which adhesively secures the label or laminate to a surface of interest, can also be nearly any type of adhesive including those previously described. In many embodiments, this layer of adhesive includes a pressure sensitive adhesive.

In certain embodiments of the present subject matter, the adhesive strength, the relative tackiness, and/or other properties of the two adhesive layers may be selectively tailored relative to one another.

The tamper indicating layer is formed from a material that exhibits sufficiently weak strength, and particularly "low strength" as compared to the strength of other layers in the label or laminate such as the outer layer. The term "low strength" when used in association with the materials for the tamper indicating layer generally refers to materials having relatively low tensile strengths such as for example less than about 2,000 g/in, in certain embodiments less than 1,500 g/in, in certain embodiments less than 1,200 g/in, in certain embodiments less than 1,000 g/in, in certain embodiments less than 750 g/in, in certain embodiments less than 500 g/in, and in certain embodiments less than 250 g/in. However, it will be appreciated that the present subject matter includes the use of materials in the tamper indicating layer having tensile strengths greater than or less than these values. A variety of materials could potentially be used for the tamper indicating layer. As noted, the tamper indicating layer is periodically referred to herein as an interior weak or weakened material layer. For example, sufficiently weak or "tearable" fabrics and nonwoven materials could be used. Foamed materials could also be used. Additional examples of materials that could be used for the tamper indicating layer include paper, films, and coatings which exhibit the noted low strength characteristic. Another example of a class of materials suitable for use as the tamper indicating layer is tissue paper. Combinations of these materials are also contemplated.

A wide array of tissue paper can be used in the tamper indicating layer. Generally, tissue papers can be manufactured on any type of paper machine, from nearly any type of pulp, including reclaimed paper stock. Tissue papers typically have a gauze-like texture, but may be glazed, unglazed, or creped. Various grades of tissue paper are known. Typically, tissue papers have weights of from about 10 gsm to about 60 gsm, and particularly about 30 gsm to about 50 gsm, and in certain embodiments 40 gsm. The tensile strength of dry tissue paper in the machine direction is between about 500 to 1,200 g/in. Tensile strength in the transverse direction is between about 200 to 550 g/in. In certain embodiments, the wet tensile strength in the machine direction is targeted to be between about 350 to 450 g/in. In certain embodiments, a wet strength lower than 250 g/in is not desirable, but a higher wet machine direction tensile strength is acceptable.

The release layer or liner in the present subject matter labels and/or laminates can be formed from a wide array of known or conventional release layers. An example is a paper layer having a silicon based release agent on a face for contacting an adhesive layer.

The tamper indicating provisions, if used, can include a variety of visually observable agents such as inks, dyes, pigments, or colorants as previously noted. The tamper indicating provisions can also include and/or be in the form of watermarks, embossing, foil stamps, and holograms. In addition, the tamper indicating provisions can also include fibers, e.g., security fibers, and detectable agents. Combinations of these are also contemplated. Moreover, the tamper indicating provisions can be in the form of embossed indicia, logos, or designs which are incorporated within the tamper indicating layer. The tamper indicating provisions can also be in the form of colors or combinations of colors that are revealed upon separation of the layer. The tamper indicating provisions can also include one or more fluorescent agents to further enhance or provide visual indication of tampering or attempted tampering. The tamper indicating provisions can also be in the form of indicia, designs, patterns, and/or information-conveying formats such as messages to indicate tampering. The tamper indicating provisions can also be in the form of optical effects, printed patterns, embossed patterns, hot stamped patterns, and agents made visible by tools or techniques as described in greater detail herein. The tamper indicating provisions can be segregated into one or a plurality of regions within the tamper indicating layer. Alternatively, the tamper indicating provisions can be distributed throughout and/or relatively uniformly throughout the tamper indicating layer. The tamper indicating provisions can also be incorporated along a face or surface of a tamper indicating layer.

Although the present subject matter labels and adhesive laminates are primarily directed to tamper indicating layers that provide visual indication of tampering or label manipulation, the subject matter also includes tamper indicating layers that provide other forms of tamper indication or manipulation. For example, tamper indicating layers that provide tactile indication by exposing of roughened or embossed patterns are contemplated. In addition, the present subject matter includes the use of techniques, tools, devices, and/or other means to facilitate or promote visual indication of tampering. For example, the tamper indicating provisions can be in the form of security dyes or inks which are not visible unless viewed under UV light, or developed or activated such as by heating or application of an appropriate agent. Developer fluids or agents can be administered in vapor form or spray applied to a surface of interest.

The labels and laminates described herein are generally used by applying to an article such as a container by removing the release layer from the label and contacting the exposed adhesive face to the container. The label can be applied over a lid, e.g., a container aperture component, or other container opening, so that upon an initial opening or attempted opening of the lid or container, or attempted removal of the label from the container, the label breaks, splits, or becomes partially detached from the container. Specifically, the tamper indicating layer splits or otherwise separates and one portion remains adhered to the container along with a layer of the adhesive, to thereby indicate that the container has previously been opened or that tampering occurred.

The labels can be used in a variety of applications and market segments such as food products, home products, personal care products, auto parts, and pharmaceuticals for example. A wide array of applications and uses are contemplated.

The labels and laminates of the present subject matter can also include one or more other layers or components. For example, as previously noted one or more top coats could be applied to the outer layer. Overt or covert security features could also be printed on the outer layer or otherwise incorporated in the labels and laminates. In certain embodiments, the labels or laminates include a tamper indicating layer that is immediately adjacent to and thus in contact with and disposed between two adhesive layers. And, in particular embodiments, such a layered array is in combination with an outer layer so that the outer layer is immediately adjacent to and thus in contact with one of the adhesive layers of the layered array.

Example

Tissue paper with a grammage of 40 gsm was first printed with a message "Tamper Evident" and then laminated to a printable paper (73 gsm grammage) top face with a hot melt pressure sensitive adhesive of 16 gsm coat weight. After lamination, the message printed on the tissue paper was no longer clearly visible from the top side of the laminate. The resulting construction provided one side of the tissue paper as an exposed or open side on the bottom of the laminate. The composite face was then coated on the open side of the tissue paper with a pressure sensitive adhesive of 16 gsm coat weight and protected with a silicone release liner. The label was then applied to a HDPE panel and left to age for 24 hours in ambient environment prior to the tampering investigation. When tampered with (after 24 hours) the label split off into two layers. The hidden message that was printed on the tissue paper was clearly visible on both the split layers.

Many other benefits will no doubt become apparent from future application and development of this technology.

All patents, published applications, and articles noted herein are hereby incorporated by reference in their entirety.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. An adhesive laminate configured to provide indication of tampering, the laminate comprising:
   an outer layer defining an outer face, the outer layer is a facestock layer;
   a first adhesive layer adjacent to the outer layer;
   a tamper indicating layer adjacent to the first adhesive layer; and
   a second adhesive layer adjacent to the tamper indicating layer;
   wherein the first adhesive layer is disposed between the outer layer and the tamper indicating layer, and the tamper indicating layer is disposed between the first adhesive layer and the second adhesive layer;
   wherein the tamper indicating layer is configured such that the tamper indicating layer at least partially separates or splits along a separation plane or separation interface within the tamper indicating layer to thereby provide indication of tampering when there is any manipulation of the laminate.

2. The laminate of claim 1, wherein the tamper indicating layer at least partially separates or splits along one or more predefined regions or planes within the tamper indicating layer.

3. The laminate of claim 2, wherein the one or more predefined regions or planes extends entirely or partially along the midsection or midplane of the tamper indicating layer.

4. The laminate of claim 2, wherein the one or more predefined regions or planes extend along a separation plane, boundary, or interface that is distinct and separate from a midsection or midplane of the tamper indicating layer.

5. The laminate of claim 2, wherein the one or more predefined regions or planes are structurally or chemically weakened regions extending in a tamper indicating layer such that upon separation of the layer, separation occurs along a desired separation interface.

6. The laminate of claim 1, wherein the tamper indicating layer has a tensile strength less than about 2,000 g/in.

7. The laminate of claim 6, wherein the tamper indicating layer has a tensile strength less than about 1,500 g/in.

8. The laminate of claim 7, wherein the tamper indicating layer has a tensile strength less than about 1,200 g/in.

9. The laminate of claim 8, wherein the tamper indicating layer has a tensile strength less than about 1,000 g/in.

10. The laminate of claim 9, wherein the tamper indicating layer has a tensile strength less than about 750 g/in.

11. The laminate of claim 10, wherein the tamper indicating layer has a tensile strength less than about 500 g/in.

12. The laminate of claim 1 further comprising a release layer disposed adjacent to the second adhesive layer.

13. The laminate of claim 1 wherein the outer layer is disposed immediately adjacent to the first adhesive layer, and the tamper indicating layer is disposed immediately adjacent to the first adhesive layer and also immediately adjacent to the second adhesive layer.

14. The laminate of claim 1 further comprising tamper indicating and/or authenticity indicating provisions disposed within the tamper indicating layer.

15. The laminate of claim 14, wherein the tamper indicating and/or authenticity indicating provisions are in the form of a single region or a plurality of regions.

16. The laminate of claim 14, wherein the tamper indicating and/or authenticity indicating provisions are visually perceivable materials selected from the group consisting of inks, dyes, pigments, colorants, other visually perceivable materials, and combinations thereof that upon separation of the tamper indicating layer are exposed to indicate that at least partial separation of the tamper indicating layer has occurred.

17. The laminate of claim 14, wherein the tamper indicating and/or authenticity indicating provisions comprise security dyes or inks that are viewable under UV light or are viewable after development or activation by a stimulus (e.g., heat or application of an agent).

18. The laminate of claim 14, wherein the tamper indicating and/or authenticity indicating provisions are selected from watermarks, foil stamps, holograms, and combinations thereof.

19. The laminate of claim 14, wherein the tamper indicating and/or authenticity indicating provisions are tactile indicators selected from the group consisting of patterns, roughness, texture, embossing, and combinations thereof.

20. The laminate of claim 14, wherein the tamper indicating and/or authenticity indicating provisions are located in only one of the portions of the tamper indicating layer after separation.

21. The laminate of claim 1, wherein the facestock layer is a paper material.

22. The laminate of claim 1, wherein the facestock layer is a polymeric film.

23. The laminate of claim 1, wherein the outer layer is opaque.

24. The laminate of claim 1, wherein the outer layer has a printable outer surface.

* * * * *